(12) United States Patent
Schell et al.

(10) Patent No.: US 8,197,230 B2
(45) Date of Patent: Jun. 12, 2012

(54) TORSIONAL DAMPER FOR A FLUID PUMP

(75) Inventors: William L. Schell, Morton, IL (US);
Thomas A. Brosowske, Peoria, IL (US);
Paul F. Olsen, Chillicothe, IL (US);
Thomas L. Atwell, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 669 days.

(21) Appl. No.: 12/315,433

(22) Filed: Dec. 3, 2008

(65) Prior Publication Data
US 2009/0160113 A1    Jun. 25, 2009

Related U.S. Application Data

(60) Provisional application No. 61/008,708, filed on Dec. 21, 2007.

(51) Int. Cl.
*F04B 53/00*    (2006.01)
*F16F 15/06*    (2006.01)

(52) U.S. Cl. ........................................ 417/313; 267/137

(58) Field of Classification Search .................... 74/411;
464/61.5–65.1; 417/313; 188/217; 267/136, 267/137, 167, 174, 179
See application file for complete search history.

(56) References Cited

U.S. PATENT DOCUMENTS

| 306,267 | A |   | 10/1884 | Turno |   |
|---|---|---|---|---|---|
| 791,329 | A | * | 5/1905 | Dodge | .......................... 464/66.1 |
| 1,799,987 | A |   | 4/1931 | Rauen |   |
| 4,148,200 | A | * | 4/1979 | Schallhorn et al. | .............. 464/27 |
| 5,528,945 | A | * | 6/1996 | Okada | ............................ 74/7 A |
| 5,725,449 | A |   | 3/1998 | Park |   |
| 5,791,190 | A |   | 8/1998 | Konno |   |
| 5,794,529 | A |   | 8/1998 | Dawley et al. |   |
| 5,870,928 | A |   | 2/1999 | Genter et al. |   |
| 6,048,284 | A |   | 4/2000 | Gerhardt et al. |   |
| 6,161,521 | A |   | 12/2000 | Russ et al. |   |
| 6,402,621 | B1 |   | 6/2002 | Cooke et al. |   |
| 7,086,302 | B2 |   | 8/2006 | Ask et al. |   |
| 2005/0229728 | A1 |   | 10/2005 | Otsuki |   |

* cited by examiner

*Primary Examiner* — Peter Macchiarolo
*Assistant Examiner* — Steven Horikoshi
(74) *Attorney, Agent, or Firm* — Liell & McNeil

(57) ABSTRACT

A damper assembly including an input member, an output member, and a transfer assembly is disclosed. The input member is configured to receive a torsional input. The output member is configured to provide a torsional output. The transfer assembly is coupled between the input member and the output member and includes a ring, a first guide, a second guide, a first spring, and a second spring. The ring defines a first linear slide path that has a first end and a second end, and a second linear slide path that has a third end and a fourth end. The first guide is slideable within the first linear slide path and coupled to the input member. The second guide is slideable within the second linear slide path and coupled to the input member. The first spring is positioned between the first guide and the second end of the first linear slide path. The second spring is positioned between the second guide and the fourth end of the second linear slide path. Movement of the input member relative to the output member causes the first guide to slide along the first linear slide path and the second guide to slide along the second linear slide path.

18 Claims, 7 Drawing Sheets

TORSIONAL DAMPER FOR A FLUID PUMP

CROSS-REFERENCE TO RELATED APPLICATIONS

This application claims priority to provisional U.S. Patent Application Ser. No. 61/008,708, filed Dec. 21, 2007, entitled "TORSIONAL DAMPER FOR A FLUID PUMP," the disclosure of which is hereby incorporated herein by reference.

TECHNICAL FIELD

The present disclosure relates to torsional damper assemblies. More particularly, the present disclosure relates to torsional damper assemblies for use with high-pressure fuel pumps.

BACKGROUND

Modern common rail fuel systems typically include multiple fuel injectors connected to a common rail that is supplied with high-pressure fuel by a high-pressure fuel pump. To enable the utilization of different injection strategies (e.g., different injection timings, volumes, etc.), the high-pressure fuel pump is usually a variable discharge pump. One type of variable discharge pump is an outlet metered, camshaft driven pump. In many cases, these pumps include a driven gear coupled to the camshaft of the pump that is driven by a driving gear provided within the geartrain on the front of the engine, which ultimately receives its power from a gear coupled to the engine crankshaft.

A camshaft driven, outlet metered pump generally includes multiple plunger assemblies, each including a plunger that is disposed within an individual pumping chamber or bore. Each of the plunger assemblies is configured to engage a lobe of the camshaft such that the rotation of the camshaft causes the plunger to reciprocate within its bore between a top dead center position and a bottom dead center position. The plunger acts to pressurize and eventually displace fuel (to the common rail) from the pumping chamber when it moves from its bottom dead center position to its top dead center (its pumping stroke), and allows the pumping chamber to refill with fuel when it moves from its top dead center position to its bottom dead center position (its refilling stroke). The amount of fuel pumped by each plunger to the common rail will depend on the amount of fluid spilled or diverted to a low-pressure reservoir during the pumping stroke of the plunger. Due to the nature of the pump, the torque resistance it applies to the geartrain system will fluctuate. The torque resistance fluctuation is due, at least in part, to the different stages the plungers pass through during a revolution of the pump camshaft as well as to the varying output demands placed on the pump over time.

Although such a pump serves to effectively pressurize fuel for a common rail fuel system, its cyclical and varying operation, as well as the torque resistances it provides may have an effect on the geartrain that powers the pump. One source of this effect is due primarily to the nature of gears. When two gears mesh, the imperfections of the individual gear teeth (albeit very small in many cases) create a situation where some cooperating teeth may align properly while others may be slightly misaligned. Thus, as one set of teeth goes out of engagement, there may be a small gap between the next cooperating set of teeth. One of the two cooperating gears may then accelerate until the gears impact one another. The magnitude of the loads generated from these impacts will depend on the magnitude of the torques being transferred between the gears. In general, as the torques transferred between the gears become higher, the impact loads become higher. At some point, the impact loads can potentially result in gear damage. In addition, the impacts between the gear teeth can also produce undesirable noise. The cyclical and varying operation of the pump may also contribute to higher impact loads and noise. For example, in some cases, the pump may be configured such that at certain points within its operating cycle the pump actually produces negative torque resistance to the system, which may temporarily create gear teeth separation, which will then result in gear teeth impacts when the torque resistance of the pump shortly thereafter becomes positive again. Moreover, inertial forces, as well as the resilient nature of some components when exposed to high torques, may also create situations where gear teeth momentarily separate and then impact one another when the teeth come back together, resulting in high impact loads and noise.

A torsional vibration damper is described in U.S. Pat. No. 6,402,621, which includes an input element and an output element, both rotatable against the action of a damping means. The damping means includes a plurality of linkages, each linkage comprising a plurality of interconnected links configured to act upon a plurality of spring members. At least one of the interconnected links is flexible in an axial direction relative to the remainder of the damping means to accommodate relative tilting of the damper elements. Although the described damper may provide sufficient damping in certain applications, it should be appreciated that there is a continuing need for improved damping means in various applications. Further, there is a need for damping assemblies having improved performance that may be used in applications subject to strict spatial constraints.

The present disclosure is directed to one or more of the problems set forth above.

SUMMARY OF THE DISCLOSURE

According to one exemplary embodiment, a damper assembly comprises an input member, an output member, and a transfer assembly. The input member is configured to receive a torsional input. The output member is configured to provide a torsional output. The transfer assembly is coupled between the input member and the output member and comprises a ring, a first guide, a second guide, a first spring, and a second spring. The ring defines a first linear slide path that has a first end and a second end, and a second linear slide path that has a third end and a fourth end. The first guide is slideable within the first linear slide path and coupled to the input member. The second guide is slideable within the second linear slide path and coupled to the input member. The first spring is positioned between the first guide and the second end of the first linear slide path. The second spring is positioned between the second guide and the fourth end of the second linear slide path. Movement of the input member relative to the output member causes the first guide to slide along the first linear slide path and the second guide to slide along the second linear slide path.

According to another exemplary embodiment, a method of providing torsional damping comprises the steps of receiving a torque input from an input member and converting the torque input into at least one force vector acting on a moveable second member, the at least one force vector including a first component vector and a second component vector perpendicular to the first component vector. The method also includes the steps of transferring the first component vector to a third member and transferring the second component vector to a resilient member, the resilient member having a resiliency direction parallel to the second component vector and being located between the second member and the third member. Each of the first component vector and the second component vector apply a torque to the third member.

DETAILED DESCRIPTION

Figure 1:
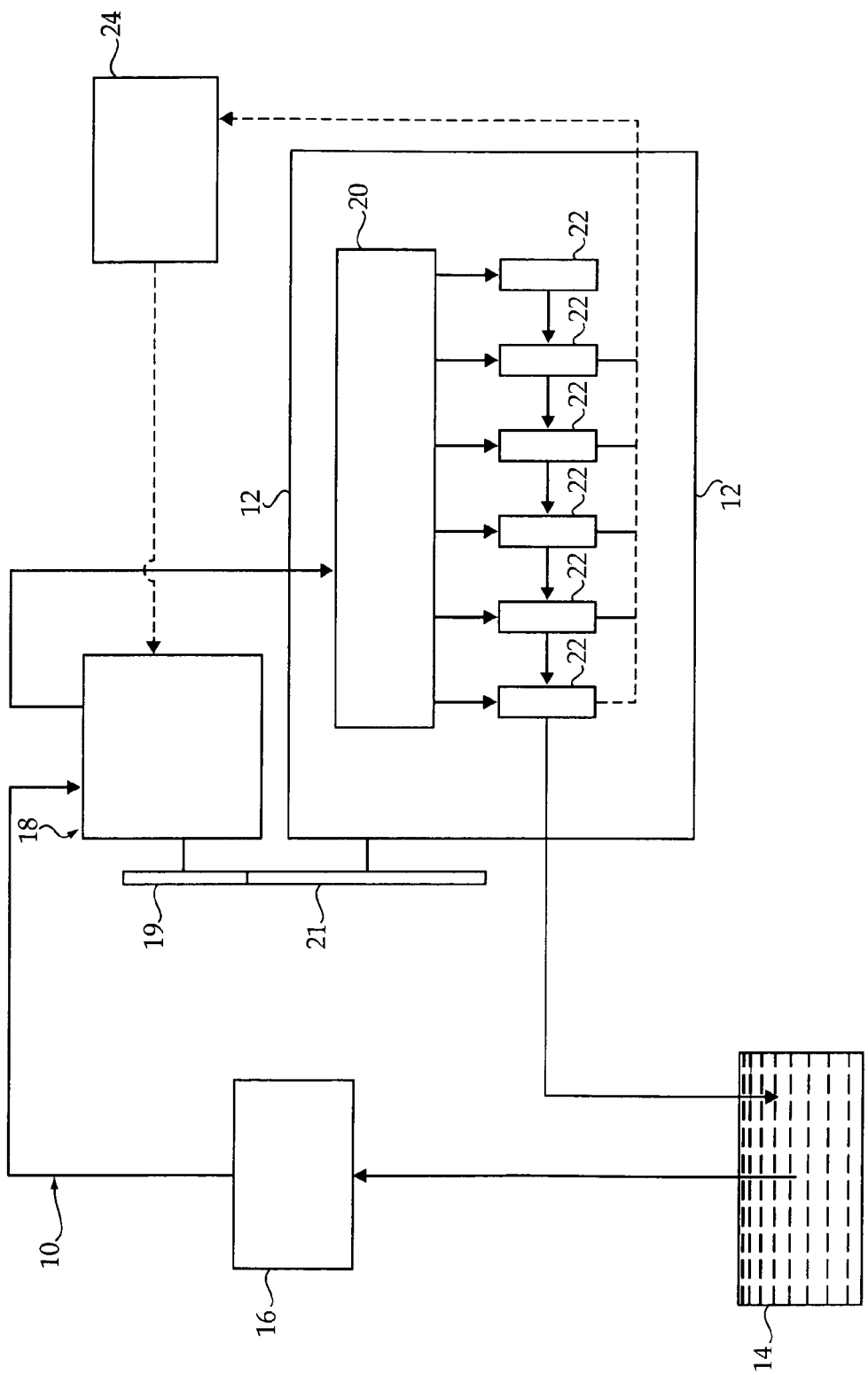
FIG. 1 is schematic illustration of a fuel system for an engine according to one exemplary embodiment.

Referring generally to FIG. 1, a fuel system 10 is shown according to one exemplary embodiment. Fuel system 10 is a system of components that cooperate to deliver fuel (e.g., diesel fuel, gasoline, heavy fuel, etc.) from a location where fuel is stored to the combustion chamber(s) of an engine 12 where the fuel will combust and where the energy released by the combustion process will be captured by engine 12 and used to generate a mechanical source of power. Although depicted in FIG. 1 as a fuel system for a diesel engine, fuel system 10 may be the fuel system of any type of engine or power source (e.g., internal combustion engine such as a diesel or gasoline engine, a turbine, etc.). According to one exemplary embodiment, fuel system 10 includes a tank 14, a transfer pump 16, a high-pressure pump 18, a common rail 20, fuel injectors 22, and an electronic controller 24.

Tank 14 is a storage container that stores the fuel that fuel system 10 will deliver. Transfer pump 16 pumps fuel from tank 14 and delivers the fuel at a generally low pressure to high-pressure pump 18. High-pressure pump 18, in turn, pressurizes the fuel to a high pressure (suitable for injection) and delivers the fuel to common rail 20. According to one exemplary embodiment, pump 18 includes an input device or element 19 (e.g., a gear or gear assembly) that is driven by a mating or cooperating element or gear 21 (e.g., a gear coupled to the engine camshaft) that makes up part of the front geartrain of engine 12. Common rail 20, which is intended to be maintained at the high pressure generated by high-pressure pump 18, serves as the source of high-pressure fuel for each of fuel injectors 22. Fuel injectors 22 are located within engine 12 in a position that enables fuel injectors 22 to inject high-pressure fuel into the combustion chambers of engine 12 (or into a pre-chamber or ports upstream of the combustion chamber in some cases) and generally serve as metering devices that control when fuel is injected into the combustion chamber, how much fuel is injected, and the manner in which the fuel is injected (e.g., the angle of the injected fuel, the spray pattern, etc.).

Each fuel injector 22 is continuously fed fuel from common rail 20 such that any fuel injected by a fuel injector 22 is quickly replaced by additional fuel supplied by common rail 20. Electronic controller 24 is a control module that receives multiple input signals from sensors associated with various systems of engine 12 (including fuel system 10) and indicative of the operating conditions of those various systems (e.g., common rail fuel pressure, fuel temperature, throttle position, engine speed, etc.). Electronic controller 24 uses those inputs to control, among other engine components, the operation of high-pressure pump 18 and each of fuel injectors 22. The purpose of fuel system 10 is to ensure that the fuel is constantly being fed to engine 12 in the appropriate amounts, at the right times, and in the right manner to support the operation of engine 12.

Figure 2:
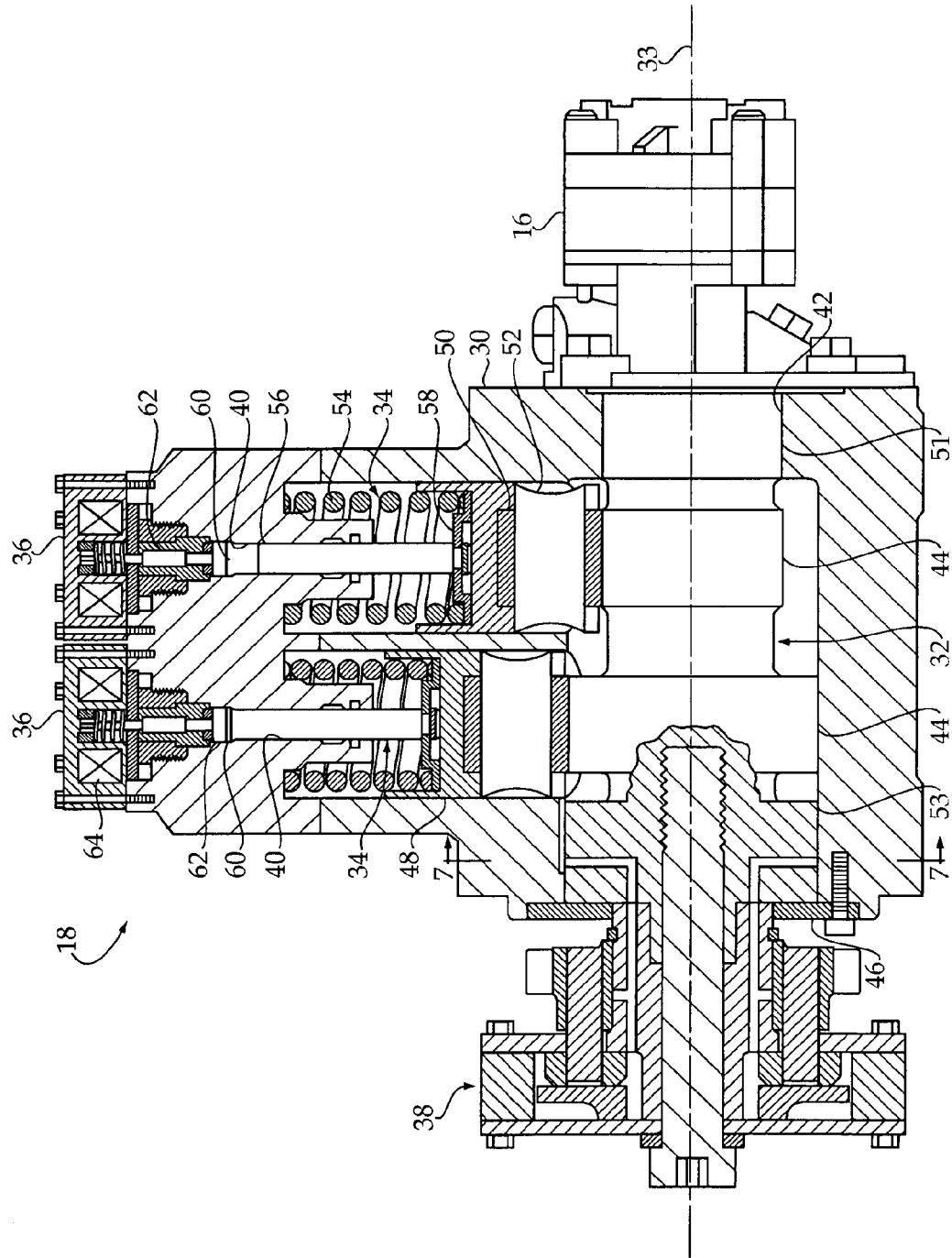
FIG. 2 is a cross-sectional side view of a high-pressure pump of the fuel system of FIG. 1 shown coupled to a damper assembly according to one exemplary embodiment.

Referring now to FIG. 2, high-pressure pump 18 is configured to increase the pressure of the fuel from a first pressure that is sufficient to transfer the fuel from the tank 14 to a second pressure that is desirable for the injection of the fuel into the combustion chambers of engine 12 (or injection elsewhere). Such injection pressures may vary between different applications, but often range between approximately 1500 bar and 3000 bar, and may include pressures that are below 1500 bar or above 3000 bar. According to one exemplary embodiment, pump 18 includes a housing 30, a camshaft 32, two plunger assemblies 34, two valve assemblies 36, and a damper assembly 38.

Figure 7:
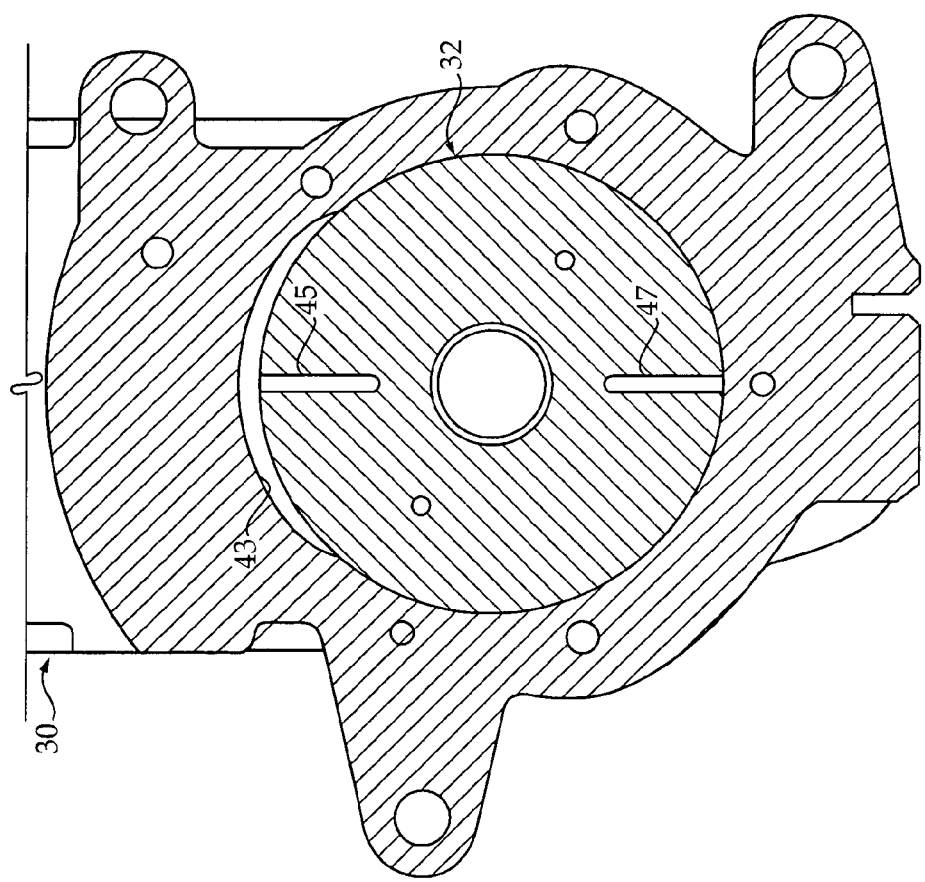
FIG. 7 is a cross-sectional end view of the high-pressure pump of FIG. 2 taken along line 7-7.

According to one exemplary embodiment, housing 30 forms the general structure of pump 18 and includes various inlet ports and passages (not shown) to transfer fuel and oil to internal components of pump 18, various outlet ports and passages (not shown) to transfer high pressure fuel to common rail 20 and to transfer other fuel and oil to various other components (e.g., to the fuel transfer pump, the engine oil sump, etc.), two generally vertically oriented barrels or bores 40 to receive each of plunger assemblies 34, a generally horizontally oriented bore 42 to receive camshaft 32, a recessed region 43 within a portion of bore 42 (see FIGS. 2 and 7), and various mounting structures that facilitate mounting pump 18 to an engine, such as engine 12. The axis of each bore 40 is arranged perpendicularly (or radially) to the axis of bore 42 such that the rotation of camshaft 32 within bore 42 causes each plunger assembly 34 to translate in a linear, reciprocating manner within the corresponding bore 40.

Recessed region 43 extends radially outwardly into a portion of bore 42 near an end of camshaft 32 that is closest to damper assembly 38. According to one exemplary embodiment, recessed region 43 extends between approximately 40 degrees and approximately 180 degrees around the circumference of bore 42, and more specifically, between approximately 80 degrees and approximately 120 degrees around the circumference of bore 42, and more specifically, approximately 102 degrees around the circumference of bore 42. Recessed region 43 is configured to permit lube oil from within the cavity that surrounds camshaft 32 to communicate with ducts (described below) provided in camshaft 32 that facilitate the transfer of lube oil to damper assembly 38. According to various exemplary and alternative embodiments, the housing 30 may be made up of one or more elements or pieces.

According to one exemplary embodiment, camshaft 32 is a driven member that is formed from an elongated shaft that rotates around an axis 33. Camshaft 32 includes two journals 51 and 53 and two sets of cam lobes 44 that are spaced apart along the length of camshaft 32. Journals 51 and 53 form the portions of camshaft 32 that are supported within housing 30 (e.g., such as by a journal bearing or the like). Journal 53, which is the journal closest to damper assembly 38, includes two opposing ducts 45 and 47 (see FIG. 3). Each of ducts 45 and 47 includes a radial segment that extends radially inwardly from the surface of journal 53 and an axial segment that extends axially toward an end 46 (discussed below) of camshaft 32. Ducts 45 and 47 generally serve as passageways for oil between recessed region 43 of housing 30 and damper assembly 38. According to various alternative and exemplary embodiments, the ducts 45 and 47 may take any configuration suitable to allow at least some oil to flow between the cavity that surrounds camshaft 32 and damper assembly 38. For example, the ducts 45 and 47 may extend axially from end 46 of camshaft 32 to an opposite side of journal 53 that opens up into the camshaft cavity that is at least partially filled with oil. According to still other alternative and exemplary embodiments, the camshaft 32 may not include the ducts 45 and 47, and damper assembly 38 may be lubricated in another way.

The two sets of cam lobes 44 are spaced apart along the length of camshaft 32 so as to correspond with each of the two plunger assemblies 34. According to various exemplary and alternative embodiments, each set of cam lobes 44 may include a single cam lobe, two cam lobes, three cam lobes, or more than three cam lobes, with each cam lobe representing a complete pumping and refilling cycle. According to other various alternative and exemplary embodiments, the two sets of cam lobes 44 may be in phase with one another (such that the cam lobes of the first cam lobe set will pass under the corresponding bore 40 at the same time the corresponding cam lobes of the second cam lobe set will pass under the corresponding bore 40) or they may be out of phase with one another (such that the cam lobes of the first cam lobe set will pass under the corresponding bore 40 at different times than the corresponding cam lobes of the second cam lobe set will pass under the corresponding bore 40). According to other various alternative and exemplary embodiments, the extent to which the cam lobes of the first cam lobe set may be out of phase relative to the cam lobes of the second cam lobe set may vary depending on the application of pump 18 and other factors. Camshaft 32 also includes an end 46 that includes a threaded bore 49 that is configured to facilitate the coupling of damper assembly 38 to camshaft 32.

Referring still to FIG. 2, each plunger assembly 34 is configured to engage one of the two sets of cam lobes 44 and transform the rotational movement of the corresponding cam lobes 44 into reciprocating linear movement of plunger assembly 34. According to one exemplary embodiment, each plunger assembly 34 includes a body 48 that reciprocates within an enlarged portion of bore 40, a roller 50 that engages and follows a corresponding set of cam lobes 44, a pin 52 that couples roller 50 to body 48, a resilient member 54 (shown as a compression spring) that biases body 48 toward camshaft 32, a plunger 56 that reciprocates within a reduced diameter portion of bore 40, and a retainer 58 that serves to couple plunger 56 to body 48. Plunger 56, a portion of bore 40, and a portion of valve assembly 36 form a pumping chamber 60 that changes volume as plunger 56 reciprocates. When plunger 56 moves downward, or toward camshaft 32, during the refilling stroke, the volume of pumping chamber 60 increases and fluid is allowed to flow into chamber 60 to consume the increasing volume. When plunger 56 moves upward, or away from camshaft 32, during the pumping stroke, the volume of pumping chamber 60 decreases (unless valve assembly 36 is in a position that allows fluid to escape from pumping chamber 60). The decreasing volume causes the pressure of the fluid within pumping chamber 60 to increase and to be pushed through an outlet check valve to common rail 20.

Each valve assembly 36 generally serves to control the fluid communication between pumping chamber 60 and the fuel being provided by transfer pump 16, and therefore is capable of controlling the amount of fuel that enters pumping chamber 60 during the refilling stroke and/or the amount of fuel that remains in pumping chamber 60 during the pumping stroke. Thus, the output of the pump 18 can be controlled or metered through the selective actuation of valve assembly 36. According to one exemplary embodiment, valve assembly 36 includes a valve element 62 and an actuator 64. Valve element 62 is moveable between an open position in which a fuel inlet passage (not shown) is fluidly connected to pumping chamber 60 and a closed position in which the fuel inlet passage is not fluidly connected to, or is sealed off from, pumping chamber 60. To enable valve element 62 to selectively open and close pumping chamber 60 to the fuel inlet passage, a portion of valve element 62 extends into bore 40 and forms a portion of pumping chamber 60. Actuator 64 is an electronically controlled device that generates movement in response to an electric signal. Actuator 64 is coupled to valve element 62 and serves to control the movement of valve element 62 between the open position and the closed position. According to one exemplary embodiment, actuator 64 utilizes a solenoid and armature coupled to the valve assembly 36 to move valve element 62. According to various alternative and exemplary embodiments, the actuator 64 may utilize other sources of actuation, such as a piezo actuation system, a hydraulic actuation system, a pneumatic actuation system, or any other suitable actuation system.

Figure 3:
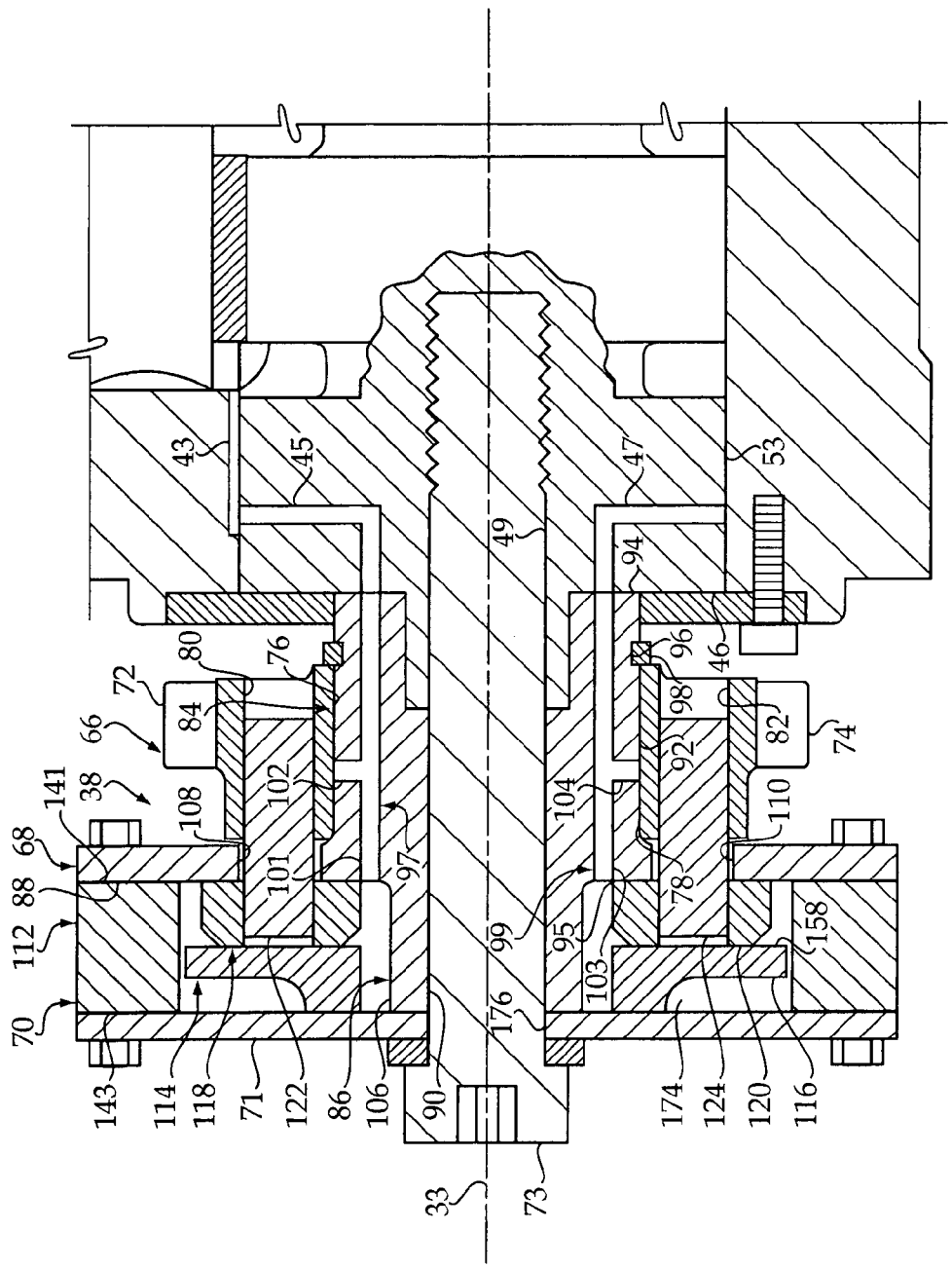
FIG. 3 is a cross-sectional side view of the damper assembly of FIG. 2 shown enlarged.

Referring now to FIGS. 2 and 3, damper assembly 38 is an assembly of components that cooperate together to dampen torque fluctuations that may take place between an input power source (such as gear 21 of engine 12) and camshaft 32 of pump 18. According to one exemplary embodiment, damper assembly 38 serves as input device 19 to pump 18 and includes an input member 66, an output member 68, a transfer assembly 70, a plate 71, and a fastener 73, all of which are described in greater detail below.

Input member 66 is an element or device that receives torque from another mating or cooperating member and transfers the torque to transfer assembly 70. According to one exemplary embodiment, input member 66 is a spur or input gear 72 that mates with a cooperating spur gear 21 (see FIG. 1) that is provided in the front geartrain of engine 12. Gear 21 serves as a drive gear and gear 72 serves as a driven gear that receives a torque provided by gear 21. Gear 72 includes teeth 74 that extend around its outer diameter and that engage corresponding teeth on gear 21, a central bore 76 that defines an inside surface 78, and two apertures 80 and 82 located on opposite sides of axis 33 that are each configured to receive a portion of transfer assembly 70. Central bore 76 and inside surface 78 are configured to receive a portion of output member 68 and to allow input member 66 to at least partially rotate around axis 33 relative to output member 68. According to various alternative and exemplary embodiments, the input member 66 may take any one of a variety of different forms that allow for the transfer of a torque to the input member 66. For example, the input member 66 may take the form of a pulley and be driven by a belt, the input member 66 may take the form of a sprocket and be driven by a chain, or the input member 66 may take any one of a variety of other forms (e.g., helical gear, herringbone gear, bevel gear, etc.).

Output member 68 is an element or device that receives torque from transfer assembly 70 and transfers the torque to camshaft 32. According to one exemplary embodiment, output member 68 is a single unitary body that includes a first hub portion 84, a second hub portion 86, a flange 88, and a bore 90. First hub portion 84 is a generally cylindrical member that includes an outer surface 92, an end 94, an opposite end 95, and passages or ducts 97 and 99. Outer surface 92 is configured to receive inside surface 78 of gear 72 in such a way that gear 72 is permitted to rotate relative to output member 68. To help retain gear 72 in place when the gear 72 is coupled to output member 68, outer surface 92 may include a circumferential groove 96 that is configured to receive a retaining ring 98 (e.g., clip, snap ring, etc.). End 94 may abut an end of camshaft 32 and may include an axially offset bore to receive an alignment pin (not shown) that is also received within a cooperating bore provided in the end of camshaft 32. According to various alternative and exemplary embodiments, end 94 may include one or more various structures or fasteners (which may or may not mate with corresponding structures on end of camshaft 32) that ensure that camshaft 32 rotates with output member 68.

Internal ducts 97 and 99 are provided on opposite sides of first hub portion 84 and are configured to cooperate with ducts 45 and 47 provided in camshaft 32 to transfer lubrication fluid (e.g., oil) to the interface between gear 72 and first hub portion 84 and to the components of transfer assembly 70. Duct 97 includes an axial component 101 that extends between end 94 and end 95 (generally parallel to axis 33) and a radial component 102 that extends radially outwardly from axial component 101 to exit first hub portion 84 at the interface between gear 72 and outer surface 92. Similarly, duct 99 includes an axial component 103 that extends between end 94 and end 95 (generally parallel to axis 33) and a radial component 104 that extends radially outwardly from axial component 103 to exit first hub portion 84 at the interface between gear 72 and outer surface 92.

Second hub portion 86 is a generally cylindrical member that extends axially from end 95 of first hub portion 84. Second hub portion 86 includes an outer surface 106 that may serve as a stop for a portion of transfer assembly 70. Flange 88 extends radially outward from the intersection of first hub portion 84 and second hub portion 86 and includes slots 108 and 110 and various structures (e.g., bolt holes) that facilitate the coupling of a portion of transfer assembly 70 to flange 88. Slots 108 and 110 are configured to allow a portion of transfer assembly 70 to extend through flange 88 and couple to gear 72 without interference from output member 68. To allow for the rotation of gear 72 relative to output member 68, and to allow a portion of transfer assembly 70 to be coupled to gear 72 without interference from output member 68, slots 108 and 110 may have an arc shape. Bore 90 extends axially through the center of output member 68 (including first hub portion 84 and second hub portion 86) and is configured to receive fastener 73. According to various alternative and exemplary embodiments, the output member 68 may be formed from two or more separate pieces coupled together. According to other various alternative and exemplary embodiments, the output member 68 may be one of a variety of different shapes, sizes, and configurations.

Figure 4:
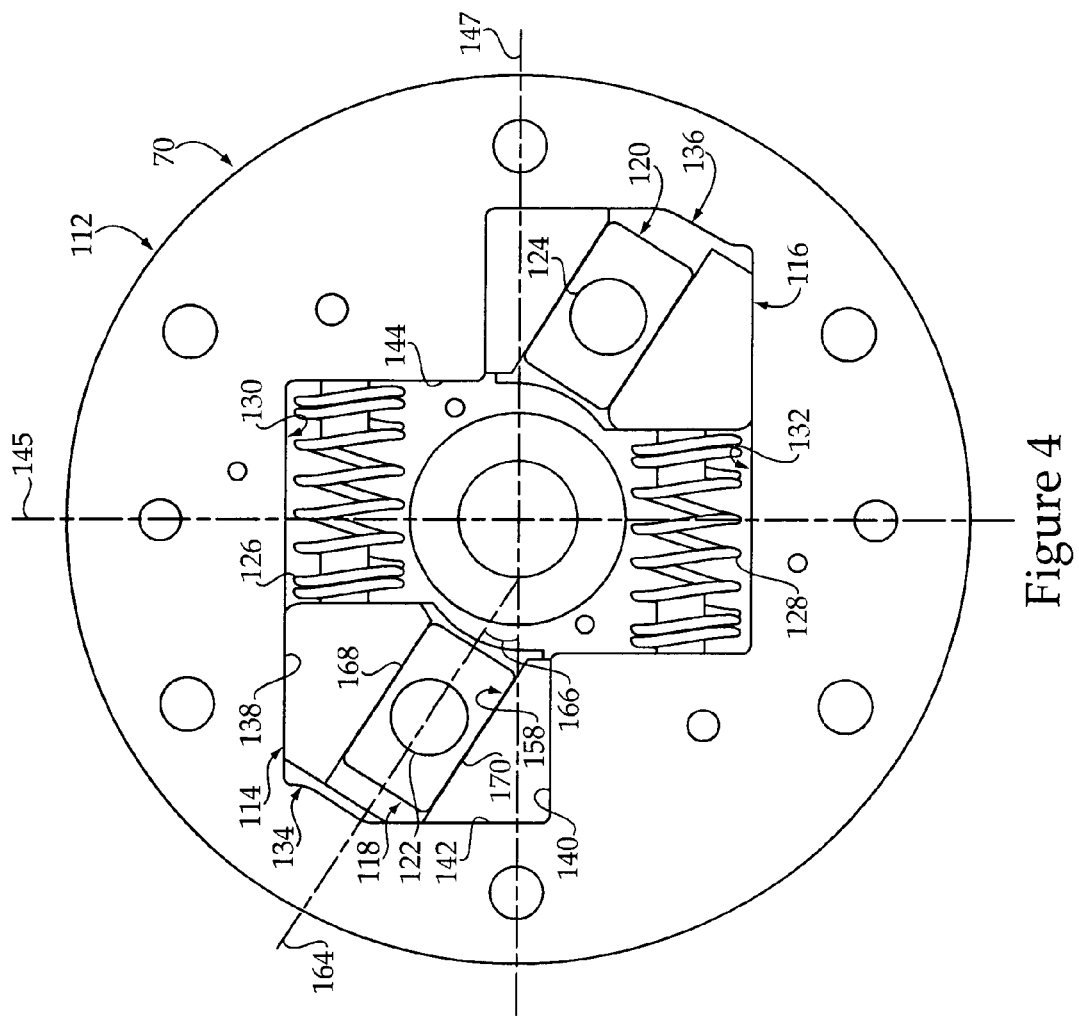
FIG. 4 is an end view of a transfer assembly of the damper assembly of FIG. 3 according to one exemplary embodiment, the transfer assembly being shown in an unloaded state.
Figure 5:
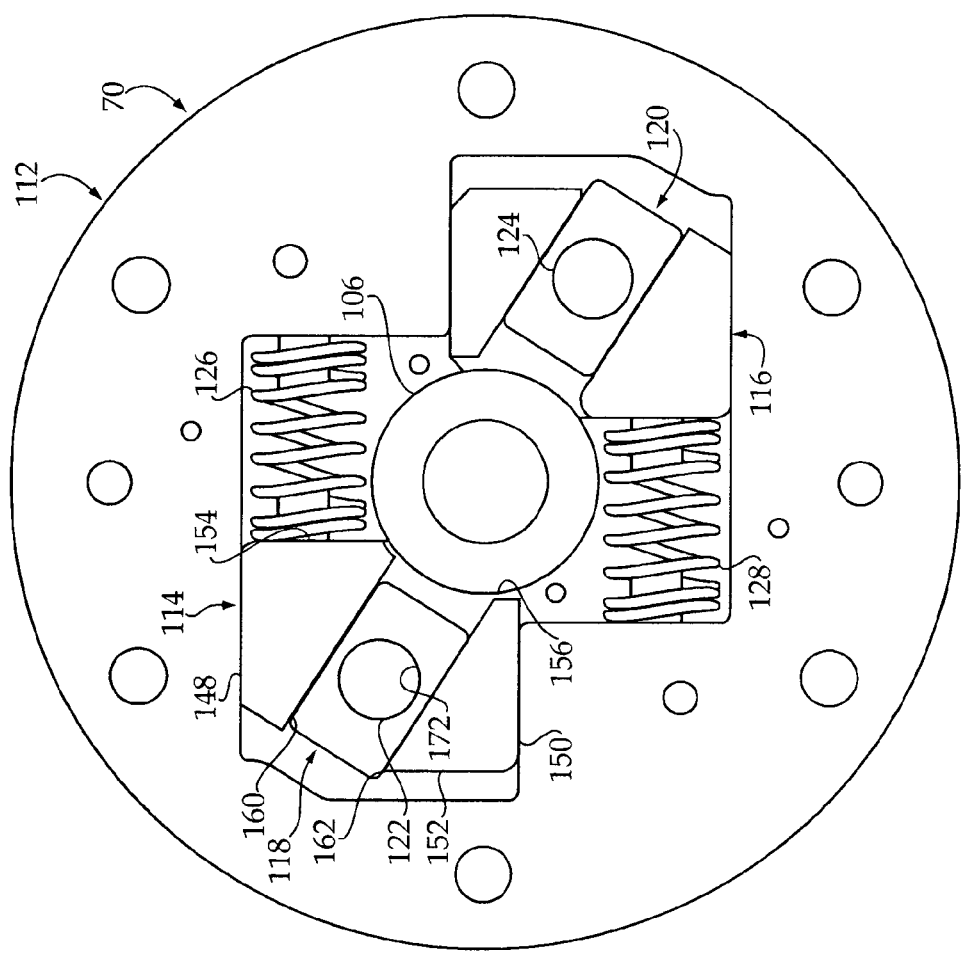
FIG. 5 is an end view of the transfer assembly of FIG. 4 shown in a loaded state.

Referring now to FIGS. 3 through 5, transfer assembly 70 generally serves to dampen the transfer of torque between input member 66 and output member 68 (or between drive gear 21 and camshaft 32). According to one exemplary embodiment, transfer assembly 70 includes a ring 112, two guides 114 and 116, two slides 118 and 120, two pins 122 and 124, and two springs 126 and 128. As can be seen from FIGS. 3 and 4, transfer assembly 70 includes two identical subsystems 134 and 136 that work together to provide the torsional damping between input member 66 and output member 68. Subsystem 134 includes a portion of ring 112, guide 114, slide 118, pin 122 and spring 126. Similarly, subsystem 136 includes a portion of ring 112, guide 116, slide 120, pin 124 and spring 128. Because the subsystems 134 and 136 are identical, only subsystem 134 will be described below, it being understood that subsystem 136 operates in the same, and complementary, manner. According to various alternative and exemplary embodiments, transfer assembly 70 could include three subsystems, four subsystems, or more than four subsystems.

According to one exemplary embodiment, ring 112 is a substantially rigid, cylindrical structure that receives the other components of transfer assembly 70 and that defines two slide paths arranged opposite one another, a slide path 130 that makes up part of subsystem 134 and that is configured to receive guide 114, and a slide path 132 that makes up part of subsystem 136 and that is configured to receive guide 116. Again, because the slide paths 130 and 132 are identical (just located in different positions) only slide path 130, which makes up part of subsystem 134, will be described below. Slide path 130 is defined by two parallel, spaced apart sides 138 and 140, an end 142, and an opposite end 144. Sides 138 and 140 define a linear slide path along which guide 114 is allowed to slide. According to one exemplary embodiment, each of sides 138 and 140 is oriented perpendicularly to a vertical axis 145 of ring 112 (or parallel to a horizontal axis 147 of ring 112). Ring 112 also includes two sides or faces, 141 and 143. Ring 112 is rigidly coupled to the side of flange 88 of output member 68 that faces away from input member 66 so that side 141 of ring 112 abuts flange 88. To facilitate the coupling of ring 112 to flange 88, ring 112 may also include various apertures that are configured to receive a fastener, such as a bolt, that extend through flange 88, ring 112 and plate 71.

Guide 114 is a generally rectangular member that is configured to slide within slide path 130 between an unloaded position and a loaded position. According to one exemplary embodiment, guide 114 includes a side 148 that interfaces with side 138 of slide path 130, a side 150 that interfaces with side 140 of slide path 130, a side 152 that abuts, or substantially abuts, end 142 of slide path 130 when guide 114 is in the unloaded position, a side 154 that engages spring 126, and a curved side 156 that extends between sides 150 and 154. Curved side 156 has a curvature that generally matches the curvature of outer surface 106 of second hub portion 86. This allows guide 114 to travel a greater distance toward second hub portion 86 and also allows outer surface 106 to serve as a stop for guide 114. Guide 114 also includes a channel 158 that is configured to receive slide 118 in a manner that allows slide 118 to slide within channel 158. Two, spaced apart, parallel sides 160 and 162 define channel 158 as well as an axis 164. Axis 164 is oriented at an angle 166 relative to horizontal axis 147 of ring 112. According to one exemplary embodiment, angle 166 may be approximately 35 degrees, but according to various alternative and exemplary embodiments, angle 166 may be modified based on the particular application in which the damper assembly 38 is used. According to other various alternative and exemplary embodiments, the guide 114 may take any one of a variety of different configurations.

Slide 118 is an element or member that is configured to receive pin 122 and to slide within channel 158 of guide 114. Generally, slide 118 serves to transfer force between pin 122 and guide 114. According to one exemplary embodiment, slide 118 has a generally rectangular shape and includes two opposing, parallel sides 168 and 170 that engage sides 160 and 162 of channel 158, respectively. Slide 118 also includes an aperture 172 that is configured to receive pin 122. According to various alternative and exemplary embodiments, the slide 118 may take any one of a variety of different configurations.

Pin 122 is an element or member that extends between input member 66 and slide 118 and that serves to transfer force between them. According to one exemplary embodiment, pin 122 is an elongated cylindrical member that is received within aperture 80 of gear 72 and aperture 172 of slide 118 and that extends between gear 72 and slide 118 through slot 108 of output member 68. According to various alternative and exemplary embodiments, the pin 122 may take any shape, size, or form that is suitable to withstand and transfer force between the input member 66 and the slide 118.

Spring 126 is a resilient member that extends between guide 114 and ring 112 and that serves as a mechanism to at least temporarily absorb or damp forces transferred between guide 114 and ring 112. According to one exemplary embodiment, spring 126 is a compression spring that extends between side 154 of guide 114 and end 144 of slide path 130 of ring 112. In this configuration, spring 126 will transfer force between guide 114 and end 144 of slide path 130. However, in doing so, spring 126 will temporarily absorb any force spikes (or temporarily store the energy associated with any force spikes) that may occur by compressing and allowing guide 114 to move toward end 144. Spring 126 will then release the stored energy, in a relatively gradual manner, by expanding and urging guide 114 away from end 144. Thus, through the use of spring 126, instantaneous force spikes can be transferred between guide 114 and ring 112 in a more gradual and less damaging manner.

To help retain spring 126 in the appropriate location, a pin 193 that extends into the center of spring 126 may be provided on end 144 and a similar pin 194 may be provided on side 154 of guide 114. The appropriate characteristics of spring 126, such as the physical size of the spring and the value of its spring constant, will depend on the demands of the particular application in which the transfer assembly 70 is used. According to various exemplary and alternative embodiments, the spring 126 may be one of a variety of different types of compression springs (e.g., constant pitch, variable pitch, variable rate, etc.), it may be any other type of spring, or it may be replaced by any type of suitable resilient member that is capable of at least temporarily absorbing energy.

Referring now to FIG. 3, plate 71 is a generally flat panel that is coupled to face 143 of ring 112 and that serves to form a generally enclosed chamber 174 (in combination with ring 112 and flange 88 of output member 68) for guides 114 and 116, slides 118 and 120, and springs 126 and 128. Plate 71 may include various apertures that are configured to receive fasteners, such as bolts, that may be used to couple plate 71 to ring 112 or to couple plate 71, ring 112, and flange 88 together. Plate 71 may also include an aperture 176 in its center that is configured to receive fastener 73. According to various alternative and exemplary embodiments, plate 71 may take any one of a variety of different shapes and configurations that are suitable to form a substantially enclosed chamber 174 that receives guides 114 and 116, slides 118 and 120, and springs 126 and 128. According to other various alternative and exemplary embodiments, the damper assembly 38 may not include a plate 71.

Fastener 73 is an element or member that serves to couple the assembly that includes input member 66, output member 68, transfer assembly 70, and plate 71 to camshaft 32. According to one exemplary embodiment, fastener 73 is a bolt that extends through aperture 176 of plate 71 and bore 90 of output member 68 and threads into threaded bore 49 of camshaft 32 to retain input member 66, output member 68, transfer assembly 70, and plate 71 in place. According to various alternative and exemplary embodiments, the fastener 73 may be any one of a variety of different fasteners that is suitable to couple the other components of damper assembly 38 to camshaft 32. For example, the fastener 73 could be a generally cylindrical pin that is configured to be press-fit into a corresponding bore in camshaft 32. According to other alternative and exemplary embodiments, damper assembly 38 may be coupled to camshaft 32 in other ways. For example, camshaft 32 may include a threaded extension or stud that extends through bore 90 of output member 68 and aperture 176 of plate 71 and a nut may be threaded to the end of the stud.

According to various alternative and exemplary embodiments, the specific design features of damper assembly 38 may be altered or adjusted for each particular application. For example, the angular orientation of axis 164 of channel 158 of guide 114 relative to slide path 130, the angular orientation of slide path 130 relative to vertical axis 145, the mechanical characteristics of spring 126, and other design features may all be adjusted to tune the operation of damper assembly 38 to a particular application.

Although only one pump configuration was described in detail above, it should be understood that the described pump 18 is only one example of the many different pump types and configurations with which damper assembly 38 may be used. For example, while only an inline plunger or piston pump was described above, the damper assembly 38 could also be used within any one of a variety of different pump configurations (e.g., axial piston pump, radial piston pump, bent axis pump, inlet metered pump, outlet metered pump, etc.) and with pumps used for pumping a variety of different fluids (e.g., air, fuel, oil, coolant, etc.). It also should be understood that while pump 18 was described above as including two cylinders or pumping chambers 60, and consequently, two corresponding plunger assemblies 34 and valve assemblies 36, the pump 18 could also be configured to include one, three, four, or more than four pumping chambers, depending on the particular application in which the pump 18 is intended to be used. It should also be understood that while the pump 18 described above is an outlet metered pump, damper assembly 38 could be used with a pump having any type of metering, such as an inlet metered pump.

Although damper assembly 38 was described above as being part of a high-pressure fuel pump 18, it should also be understood that damper assembly 38 could be used in association with a wide variety of different components or devices in a wide variety of different applications. For example, damper assembly 38 could be used with other engine components that receive a torque input from the engine geartrain, and damper assembly 38 could also be used in association with a multitude of different machines, among other applications. Further, the use of damper assembly 38 is not limited to use within geartrain systems. For example, damper assembly 38 could be adapted for use within a belt driven system, a chain driven system, or other types of torque transfer systems.

INDUSTRIAL APPLICABILITY

Diesel engines, which are available in a variety of different configurations (such as 4, 6, or 8 cylinder versions), convert chemical energy into rotational mechanical energy. To accomplish this conversion, diesel fuel is sequentially burned within each of the cylinders and the energy released by the combustion process is used to drive corresponding pistons within the cylinders. Each of the pistons is coupled to a crankshaft (such as through a connecting rod or the like) in such a way that the linear movement of the pistons within the cylinders is converted into the rotational movement of the crankshaft. To provide for the relatively continuous and steady rotation of the crankshaft, the cylinders "fire" sequentially. For example, during one complete engine cycle (where each cylinder "fires" once) in a 4-stroke, 4 cylinder diesel engine, the crankshaft will turn 720 degrees and the four cylinders will fire approximately 180 degrees apart (e.g., a first cylinder will fire at 0 degrees, a second cylinder will fire at 180 degrees, a third cylinder will fire at 360 degrees, and a fourth cylinder will fire at 540 degrees). Although the crankshaft will rotate in a relatively steady and continuous fashion, the crankshaft may still experience periods of torsional acceleration that correspond to each of the combustion events. Many such engines also include a flywheel to help to further smooth out the rotation of the crankshaft.

Many modern diesel engines include a common rail fuel system, such as fuel system 10, that relies on a high-pressure fuel pump to pressurize fuel to pressures as high as 3000 bar or more for injection into the engine cylinders (or elsewhere). Pump 18 is one example of such a pump. As described above, pump 18 includes a camshaft 32 that is used to reciprocate two plunger assemblies 34. As the camshaft 32 rotates (via a torque applied by an external source, such as gear 21 coupled directly or indirectly to the crankshaft of engine 12), each of the two plunger assemblies 34 reciprocate within their respective bores 40. Depending on the particular configuration of pump 18, the torque required to turn camshaft 32, and therefore the torsional resistance pump 18 applies to gear 21, at any one time may vary depending, at least in part, on the location of plunger assemblies 34 and the particular output requirements of pump 18 at that particular time. For example, the torque required to turn camshaft 32 may be greater at a point where one of plunger assemblies 34 is half way through the pressure stroke and the other of plunger assemblies 34 is half way through the refilling stroke as compared to a point where one of plunger assemblies 34 is just beginning the refilling stroke and the other of plunger assemblies 34 is just beginning the pressure stroke. In some cases, there may be one or more points within the pump cycle where pump 18 applies a negative resistance (e.g., camshaft 32 rotates on its own due, at least in part, to the action of resilient members 54 within pump 18 urging plunger assemblies 34 downward as they move down the backside of cam lobes 44). The torsional resistance of pump 18 may also vary based on the particular output requirements for pump 18, such as the volume fuel pump 18 needs to supply to common rail 20 to maintain a desired fuel pressure dictated by the particular engine operating conditions.

Due to the nature of geartrains, the high torques introduced into the geartrain system by pump 18, and the operational characteristics of pump 18, directly coupling camshaft 32 to gear 21 (such as by fixing a gear to the end of camshaft 32 and meshing that gear with gear 21) could make the geartrain system susceptible to relatively large impact loads. The use of damper assembly 38 within the geartrain powering pump 18 is intended to help dampen these impact loads to reduce the likelihood of geartrain failure and reduce the noise produced by the geartrain.

Figure 6:
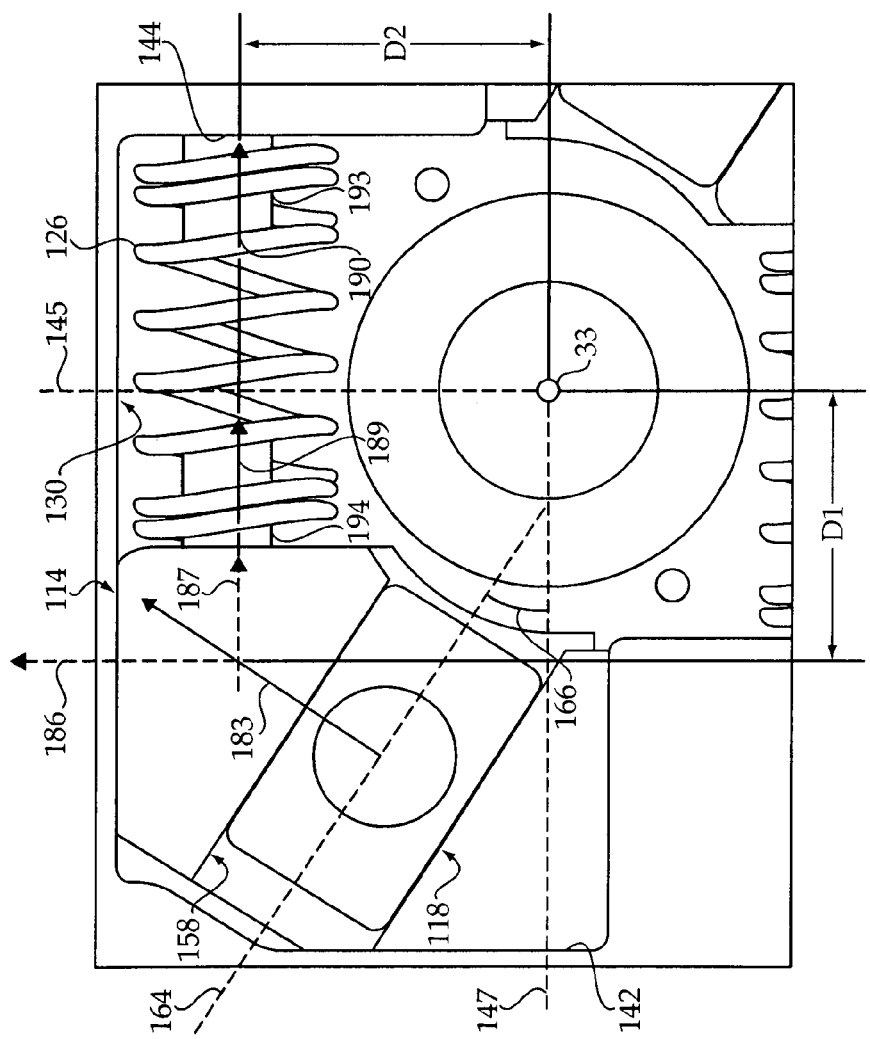
FIG. 6 is an enlarged end view of one of two subsystems of the transfer assembly of FIG. 4 according to one exemplary embodiment.

Referring now to FIG. 6, damper assembly 38 includes input member 66 that mates with, and receives an input torque from, gear 21. Input member 66 is coupled to slide 118 of subsystem 134 of transfer assembly 70 through pin 122 and ultimately transfers an input force 183 (also referenced herein as a force vector) to guide 114. More specifically, pin 122 and, thus, slide 118 will cause a movement of guide 114 that may be controlled, at least in part, by the configuration of channel 158, guide 114, and slide path 130. Input member 66 is also coupled to slide 120 of subsystem 136 of transfer assembly 70, but because subsystems 134 and 136 operate in the same way and complement each other, the operation of transfer assembly 70 will only be described in connection with subsystem 134, it being understood that subsystem 136 operates in the same manner.

During rotation of input member 66, including pin 122 and slide 118, around axis 33, input force 183, which may be perpendicular to channel 158 through the center of pin 122, may be transferred from pin 122 to slide 118, and ultimately to guide 114. Based on the configuration of guide 114, including channel 158, input force 183 may include a relatively vertical component 186, which may be parallel to vertical axis 145, and a relatively horizontal component 187, which may be parallel to horizontal axis 147. Vertical component 186 may urge guide 114 toward side 138 and, thereby, apply a torque to ring 112 that may be roughly equal to the magnitude of vertical component 186 multiplied by the distance D1 from axis 33 (treating, for simplicity, component 186 as a concentrated force).

Horizontal component 187 may urge guide 114 toward spring 126. All (or substantially all) of component 187 may be transferred to spring 126 in the form of force 189. Spring 126 then transfers a force 190 to end 144 of slide path 130 of ring 112. Force 190 acts upon ring 112 and thereby applies a torque to ring 112 that may be roughly equal to the magnitude of force 190 multiplied by the distance D2 from axis 33 (treating, for simplicity, force 190 as a concentrated force). The combination of the torque provided by vertical component 186 acting against side 138 of slide path 130 of ring 112 and the torque provided by force 190 acting against end 144 of slide path 130 of ring 112 (in addition to the same torque provided by subsystem 136) causes ring 112 to rotate around axis 33.

Ring 112 may be rigidly coupled to output member 68, and output member 68 may be rigidly coupled to camshaft 32 such that rotational movement of ring 112 is transferred to camshaft 32. According to various alternative and exemplary embodiments, not all of input force 183 may ultimately be utilized to apply a torque to ring 112. For example, a small portion of input force 183 may be lost to mechanical friction (such as any friction that may exist between guide 114 and sides 138 and 140 of slide path 130) and/or fluid friction (such as any fluid friction that may result from the movement of guide 114 within a lubrication filled cavity).

When force 189 is applied to spring 126 and when force 189 changes during the operation of pump 18, the manner in which spring 126 will react will depend on the characteristics of spring 126 (e.g., the spring constant, free length, free length when installed in the application, etc.). According to one exemplary embodiment, spring 126 is configured for each particular application in which damper assembly 38 is used so that it deflects very little, if at all, when it receives the lowest normal operating loads (associated with the lowest positive torque resistance provided by pump 18), or in other words, when the magnitude of force 189 is the lowest normal operating magnitude, and configured so that it achieves its maximum deflection when it receives the highest normal operating loads (associated with the highest positive torque resistance provided by pump 18), or in other words, when the magnitude of force 189 is the highest normal operation magnitude.

For example, the lowest normal operating loads may occur when pump 18 is at a point in its cycle where one of plunger assemblies 34 is near top dead center and just beginning its refilling stroke and the other of plunger assemblies 34 is near bottom dead center and just beginning its pressurization stroke. The highest normal operating load may occur when pump 18 is at a point in its cycle where one of plunger assemblies 34 is near the end of its pressurization stroke (when the pressure of the fuel in pumping chamber 60 is the greatest and applies the greatest resistance to the movement of plunger assembly 34) and the other of plunger assemblies 34 is near the bottom of its refilling stroke. According to various alternative and exemplary embodiments, the spring 126 may be tuned in other ways as well, depending on the particular circumstances of its use. For example, the spring 126 could be configured to deflect only when it is subjected to the highest loads or some other particular target load.

Regardless of the magnitude of force 189, spring 126 will deflect, and guide 114 will move toward end 144 of slide path 130, until the resistance force applied by spring 126 is equal to the magnitude of force 189 (or until the spring reaches its solid length, or until guide 114 contacts second hub portion 86 of output member 68). Thus, when the magnitude of force 189 changes from its lowest normal operating magnitude to its highest normal operating magnitude, guide 114 will move toward end 144 and compress spring 126 until its resistance force is equal to the magnitude of force 189. At that point, the magnitude of force 190 that spring 126 will apply to ring 112 will be equal to the magnitude of force 189. However, as spring 126 compresses, it will at least temporarily absorb and store some energy. This temporary absorption of energy by spring 126 helps to reduce the instantaneous transfer of this absorbed energy between camshaft 32 and input member 66, and therefore between input member 66 (e.g., gear 72) and gear 21 and the associated geartrain. By substantially reducing the instantaneous transfer of the absorbed energy, the use of spring 126 helps to reduce impact loads between gear 72 and gear 21, and therefore helps to reduce the likelihood of geartrain failures as well as the noise that results from impacts of the teeth of gear 72 with the teeth of gear 21.

Further, the relative rotation between the input member 66, or gear 72, and output member 68, and, thus, camshaft 32, as provided by the damper assembly 38, allows ring 112, to increase or decrease in rotational speed relative to the drive gear. The drive gear, as should be appreciated, may include gear 21, as described above, or, alternatively, camshaft 32, as described above with respect to a negative torque resistance. Such acceleration or deceleration of the rotational movement, or inertia, of ring 112, and additional fixed components of transfer assembly 70, may also absorb torque spikes and enable a steadier transfer of torque between the input gear 72 and camshaft 32 of pump 18.

It should be appreciated that the mass of guides 114 and 116 may also provide energy storage, in addition to that provided by springs 126 and 128. For example, and referring specifically to subsystem 134, the centrifugal force created by rotation of input member 66 will act on guide 114, causing guide 114 to move toward end 142 of slide path 130. As a result, rotational speed of the input member 66 may create a threshold force before which guide 114 may not be moved inward toward end 144 of slide path 130. Thus, moving the guide 114 inward, against the centrifugal force, is, in fact, energy storage, since the centrifugal force will be acting against the movement of guide 114, in the same way that spring 126 does.

According to an alternative embodiment, an additional spring, similar to spring 126, may be provided between guide 114 and ring 112. Specifically, an additional spring may extend between side 152 of guide 114 and end 142 of slide path 130 of ring 112. In this configuration, the additional spring, pushing inward on guide 114, may create an equilibrium position at any rotational speed that would respond more quickly to changes in loading, rather than requiring that the threshold force, described above, be exceeded. As should be appreciated, an additional spring acting on guide 116 may also be provided within subsystem 136 to achieve similar operational characteristics.

Depending on the particular application in which damper assembly 38 is used, the magnitude of input force 183 applied by input member 66 to transfer assembly 70 can be quite substantial. One example of an application where the magnitude of input force 183 could be quite high is a high-pressure fuel pump for a common rail fuel system of a diesel engine. Pump 18 is just one example of the many different kinds of high-pressure fuel pumps on which damper assembly 38 could be used. In these high torque or force applications, the task of designing a spring that is capable of withstanding the entire input force 183 can be a significant challenge in light of the very limited space that is often available. Damper assembly 38 helps to alleviate this challenge by ultimately breaking input force 183 into two primary components (again, assuming the relevant forces are concentrated forces, for simplicity of discussion): one component (e.g., vertical component 186) that acts perpendicularly to side 138 (or perpendicular to the slide direction of guide 114) and one component (e.g., horizontal component 187) that acts parallel to the slide direction of guide 114 against spring 126.

By breaking input force 183 into two primary component forces, a sufficient amount of damping can be achieved by damping only one of the two primary component forces 186 and 187. As a result, the size of spring 126 that is needed to provide the appropriate damping can be reduced. With a smaller spring 126, the size of damper assembly 38 may be reduced, making its application on engines or in other applications where there are significant space constraints more practical. According to one exemplary embodiment, a configuration of damper assembly 38 is chosen such that the allocation of input force 183 between the two primary component forces 186 and 187 and the characteristics of spring 126 do not create a situation in which the damping effect provided by the primary component that acts against ring 112 through spring 126 will be bypassed.

Damper assembly 38 allows for the damping between input member 66 and output member 68 by allowing for relative rotational movement between input member 66 and output member 68. When damper assembly 38 is in an unloaded state (illustrated in FIGS. 4 and 6), input member 66 is at zero degrees relative rotation to output member 68, spring 126 is in its fully extended position, and guide 114 is positioned against end 142 of slide path 130 of ring 112. When damper assembly 38 is exposed to the lowest normal operating loads, the magnitude of force component 187, resulting from rotational movement of input member 66 and thus pin 122, may cause guide 114 to move along slide path 130 toward end 144 and thereby compress spring 126 to a first length. Due to the configuration of guide 114 and slide 118, the movement of guide 114 within slide path 130 allows input member 66 and, thus, pin 122 to rotate slightly relative to output member 68.

When damper assembly 38 is exposed to the highest normal operating loads and is in its fully loaded state (illustrated in FIG. 5), the magnitude of force component 187, resulting from rotational movement of input member 66 and pin 122, which is allowed to move within slot 108, will cause guide 114 to move further along slide path 130 toward end 144 and thereby compress spring 126 to a second length (shorter than the first length). Due to the configuration of guide 114 and slide 118, the movement of guide 114 within slide path 130 allows input member 66 to rotate even more relative to output member 68. Specifically, rotation of input member 66 and pin 122, which maintains a predetermined radius from centerline axis 33, causes guide 114, having a configuration described herein, to move from end 142 toward end 156 of slide path 130. Similarly, movement of guide 114 from end 156 back toward end 142, such as by expansion of spring 126 and/or a reverse rotation of camshaft 32, causes a rotation of slide 118 and pin 122 in an opposite direction about axis 33.

The manner in which damper assembly 38 may affect the geartrain may be further explained in the following examples. Assume pump 18 is operating in a condition in which camshaft 32 is providing a first resistance torque. At this first resistance torque, guide 114 of damper assembly 38 may be somewhere between its unloaded position and its fully loaded position. Assume that pump 18 then goes into a state in which camshaft 32 produces a negative torque resistance. In this case, camshaft 32 may accelerate faster than input gear 72. In a situation where camshaft 32 was coupled directly to an input gear, this acceleration of camshaft 32 could cause a momentary separation of the teeth of the meshing gears, which would later lead to an impact situation. With damper assembly 38, this momentary acceleration of camshaft 32 will cause output member 68 to accelerate relative to input gear 72. However, instead of causing input gear 72 to accelerate relative to gear 21, damper assembly 38 may release some of the energy stored in spring 126 through the expansion of spring 126. The expansion of spring 126 (which moves guide 114 back toward its unloaded position) will then allow output member 68 to rotate relative to input gear 72 without accelerating input gear 72 and causing gear teeth separation between input gear 72 and gear 21.

Assume now, that instead of pump 18 going into a negative torque resistance state, pump 18 is operating in a positive torque resistance state and (due to the inherent imperfection of gears) a small gap is formed between the teeth of gear 21 and the teeth of input gear 72. Without damper assembly 38, gear 21 may continue turning (because it is being powered by engine 12) but gear 72 would begin to slow down because pump 18 is resisting rotation. Gear 21 would then accelerate until a tooth of gear 21 impacted a corresponding tooth of gear 72, and the tooth of gear 72 would resist that impact to the extent of the torsional resistance provided by pump 18. However, with damper assembly 38, at least a portion of the impact is at least temporarily absorbed or dampened by allowing input gear 72 to temporarily accelerate relative to output member 68 (or by allowing input gear 72 to rotate relative to output member 68) through the compression of spring 126.

According to various alternative and exemplary embodiments, the operation of damper assembly 38 can be altered or adjusted, such as for a particular application, by adjusting the orientation of slide path 130, the angle of channel 158 relative to slide path 130, the characteristics of spring 126, the travel distance of guide 114, and other characteristics and features of damper assembly 38. Thus, damper assembly 38 can be adapted not only for application on different types of high-pressure fuel pumps, but also for application on a wide variety of different devices in a wide variety of different applications (e.g., various types of pumps, engine components, drive components, etc.).

According to various alternative and exemplary embodiments, the components of damper assembly 38 may be made from one or more of a variety of different materials that are suitable for the application in which damper assembly 38 will be provided. For example, each of the components may be made from various metals, alloys, polymers, ceramics or other materials that are suitable to withstand the forces to which the particular components will be exposed during operation of damper assembly 38. According to one exemplary embodiment, materials are chosen for guides 114 and 116 that minimize the weight of these components to minimize any centrifugal forces guides 114 and 116 may be exposed to during rotation of damper assembly 38.

According to one exemplary embodiment, the lubrication system for damper assembly 38 is fluidly coupled to the lubrication system for pump 18. Referring now to FIG. 3, to transfer lubricant (e.g., oil) from pump 18 to damper assembly 38, housing 30 includes a recessed region 43 that extends radially outward into a portion of bore 42 near an end of camshaft 32 that is closest to damper assembly 38. Recessed region 43 allows oil from within the cavity that surrounds camshaft 32 to communicate with ducts 45 and 47 in camshaft 32. Output member 68 is coupled to camshaft 32 in such a way that ducts 97 and 99 within output member 68 fluidly communicate with ducts 45 and 47. Duct 97, through axial component 101 and radial component 102, and duct 99, through axial component 103 and radial component 104, transfer lubricant to the rotational interface between input member 66 and output member 68 (the interface between inside surface 78 of input member 66 and outer surface 92 of output member 68) and to chamber 174.

The lubricant within chamber 174 serves to lubricate, among other things, the interfaces between slides 118 and 120 and guides 114 and 116, respectively, as well as the interfaces between guides 114 and 116 and slide paths 130 and 132, respectively, of ring 112. The angular length of recessed region 43, in combination with the number of ducts provided in camshaft 32 and output member 68 can be adjusted to provide the appropriate lubrication to damper assembly 38. According to one exemplary embodiment, in which recessed region 43 extends approximately 102 degrees around the circumference of bore 42 and both camshaft 32 and output member 68 include two sets of ducts, lubrication will be supplied to damper assembly 38 during a total of approximately 204 degrees (or 57%) of each revolution of camshaft 32.

It should be appreciated that the lubricant supplied by the lubrication system of the damper assembly 38 may provide additional damping during movement of the components of the transfer assembly 70. For example, the lubricant may provide damping of movement of the guide 114 as it moves inward and outward along slide path 130. More specifically, as guide 114 moves inward, toward end 144 of slide path 130, pressure of the lubricant between the guide 114 and end 144 would increase, thus providing some resistive forces. As movement of the guide 114 stops, lubricant may flow from the higher pressure area (between the guide 114 and end 144) to the lower pressure area (between the guide 114 and end 142 of the slide path 130), thus providing a resistive force against the spring 126, which may increase as guide 114 moves back outward, toward end 142. In addition, check valves may be provided, which are configured to selectively open and close the slide path 130 and/or channel 158 to the supply of lubricant. For example, such check valves may be configured to open, thus providing lubricant, when slide 118 or guide 114 is moved outward, toward the unloaded position described above, and close when slide 118 or guide 114 is moved inward, toward the loaded position. In addition, the clearance around such components may be selected to achieve the desired damping force provided by the lubricant. It should also be appreciated that such lubrication may serve to not only improve damping, but also reduce noise, especially under high loading conditions.

It is important to note that the construction and arrangement of the elements of the damper assembly 38 as shown in the exemplary and alternative embodiments are illustrative only. Although only a few embodiments of the damper assembly 38 have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, orientations, etc.) without materially departing from the novel teachings and advantages of the subject matter recited. For example, elements shown as integrally formed may be constructed of multiple parts or elements shown as multiple parts may be integrally formed, the operation and relative orientations of the interfaces (e.g., channels, slides, slots, etc.) may be reversed or otherwise varied, the length or width or shape of the structures and/or members or connectors or other elements of the system may be varied, and/or the nature or number of different relative positions of the components may be varied (e.g., by variations in the locations, lengths, or angles of slots or channels).

It should be noted that the elements and/or assemblies of the damper assembly 38 may be constructed from any of a wide variety of materials that provide sufficient strength or durability, and in any of a wide variety of textures and combinations. It should also be noted that the damper assembly 38 may be used in association with any of a wide variety of different devices (e.g., such as any one of a variety of different high pressure fuel pumps) and in any of a wide variety of applications. Accordingly, all such modifications are intended to be included within the scope of the present disclosure. Other substitutions, modifications, changes and omissions may be made in the design, operating conditions and arrangement of the exemplary and alternative embodiments without departing from the spirit of the present disclosure.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A damper assembly, comprising:
an input member configured to receive a torsional input;
an output member configured to provide a torsional output; and
a transfer assembly coupled between the input member and the output member, the transfer assembly including:
a ring defining a first linear slide path having a first end and a second end, and a second linear slide path having a third end and a fourth end;
a first guide slidable within the first linear slide path and coupled to the input member;
a second guide slidable within the second linear slide path and coupled to the input member;
a first spring positioned between the first guide and the second end of the first linear slide path; and
a second spring positioned between the second guide and the fourth end of the second linear slide path;
wherein movement of the input member relative to the output member causes the first guide to slide along the first linear slide path and the second guide to slide along the second linear slide path, wherein each of the first guide and the second guide transfer a first component force vector to the ring and a second component force vector to one of the first and second springs, wherein the first component force vector is oriented at an angle greater than zero with respect to the second component force vector.

2. The damper assembly of claim 1, wherein the transfer assembly further includes:
a first slide slidable within a first channel defined by the first guide; and
a second slide slidable within a second channel defined by the second guide;
wherein movement of the input member relative to the output member causes the first slide to slide along the first channel and the second slide to slide along the second channel.

3. The damper assembly of claim 1, wherein the input member includes a first gear configured to mesh with a second gear of an engine geartrain.

4. A damper assembly, comprising:
an input member configured to receive a torsional input;
an output member configured to provide a torsional output; and
a transfer assembly coupled between the input member and the output member, the transfer assembly including:
a ring defining a first linear slide path having a first end and a second end, and a second linear slide path having a third end and a fourth end:
a first guide slidable within the first linear slide path and coupled to the input member;
a second guide slidable within the second linear slide path and coupled to the input member,
a first spring positioned between the first guide and the second end of the first linear slide path;
a second spring positioned between the second guide and the fourth end of the second linear slide path;
a first slide slidable within a first channel defined by the first guide;
a second side slidable within a second channel defined by the second, guide;
a first pin received within a first opening of the input member and a second opening of the first slide; and
a second pin received within a third opening of the input member and a fourth opening of the second slide;
wherein movement of the input member relative to the output member causes the first guide to slide along the first linear slide path, the second guide to along the second linear slide path, the first slide to slide along the first channel, and the second slide to slide along the second channel.

5. The damper assembly of claim 4, wherein the output member includes:
at least one hub portion configured to rotate with a camshaft of a pump; and
a flange extending radially outward from the at least one hub portion and including a first slot for receiving the first pin therethrough and a second slot for receiving the second pin therethrough;
wherein the transfer assembly is fixedly attached to the output member.

6. The damper assembly of claim 5, wherein the at least one hub portion includes an external surface supporting the input member and an internal surface defining a central opening for receiving a fastener for coupling the damper assembly with the camshaft.

7. The damper assembly of claim 6, further including a plate coupled to the ring, wherein the plate, the ring, and the flange define a substantially enclosed chamber housing the first guide, the second guide, the first slide, the second slide, at least a portion of the first pin, and at least a portion of the second pin.

8. The damper assembly of claim 7, wherein the at least one hub portion includes at least one internal duct configured to transfer a lubrication fluid to at least one of the transfer assembly and an interface between the external surface of the at least one hub portion and the input member.

9. The damper assembly of claim 8, wherein the internal duct is in fluid communication with a lubrication system of the pump.

10. A damper assembly, comprising:
an input member configured to receive a torsional input;
an output member configured to provide a torsional output; and
a transfer assembly coupled between the input member and the output member, the transfer assembly including:
a ring defining, a first linear slide path having a first end and a second end and a second linear slide path having a third end and a fourth end;
a first guide slidable within the first linear slide path and coupled to the input member;
a second guide slidable within the second linear slide path and coupled to the input member;
a first spring positioned between the first guide and the second end of the first linear slide path;
a second spring positioned between the second guide and the fourth end of the second linear slide path;
a first slide slidable within a first channel defined by the first guide; and
a second slide slidable within a second channel defined by the second guide;
wherein movement of the input member relative to the output member causes the first guide to slide along the first linear slide path, the second guide to slide along the second linear slide path, the first slide to slide along the first channel, and the second slide to slide along the second channel;
wherein the first channel is oriented at an angle greater than zero with respect to the first linear slide path, and the second channel is oriented at an angle greater than zero with respect to the second linear slide path.

11. A method of providing torsional damping, comprising the steps of:
receiving a torque input from an input member;
converting the torque input into at least one force vector acting on a moveable second member, the at least one force vector including a first component vector and a second component vector perpendicular to the first component vector;
transferring the first component vector to a third member; and
transferring the second component vector to a resilient member, the resilient member having a resiliency direction parallel to the second component vector and being located between the second member and the third member
wherein each of the first component vector and the second component vector apply a torque to the third member.

12. The method of claim 11, wherein the receiving step includes rotating the input member using a gear of an engine geartrain.

13. The method of claim 11, wherein the converting step includes:
moving the second member from a first end of a linear slide path toward a second end of the linear slide path; and
absorbing a portion of the second component vector using the resilient member.

14. The method of claim 13, wherein the converting step further includes moving a slide from a first end of a channel defined by the second member toward a second end of the channel.

15. The method of claim 14, further including transferring the torque input to the slide using a pin coupling the input member and the slide.

16. The method of claim 15, further including allowing relative rotational movement between the input member and the third member.

17. The method of claim 15, further including providing a lubrication fluid to at least one of the second member, the slide, and the pin.

18. The method of claim 11, further including rotating a camshaft of a pump with the third member.

* * * * *